(12) United States Patent
Yang et al.

(10) Patent No.: US 11,010,586 B2
(45) Date of Patent: May 18, 2021

(54) METHOD FOR FINGERPRINT COLLECTION AND RELATED PRODUCTS

(71) Applicant: GUANGDONG OPPO MOBILE TELECOMMUNICATIONS CORP., LTD., Guangdong (CN)

(72) Inventors: Le Yang, Guangdong (CN); Haiping Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 44 days.

(21) Appl. No.: 16/680,106

(22) Filed: Nov. 11, 2019

(65) Prior Publication Data

US 2020/0082143 A1   Mar. 12, 2020

Related U.S. Application Data

(63) Continuation of application No. PCT/CN2018/084707, filed on Apr. 26, 2018.

(30) Foreign Application Priority Data

May 22, 2017  (CN) .......................... 201710366587.1

(51) Int. Cl.
*G06K 9/00* (2006.01)
*G06F 3/041* (2006.01)
*G06K 9/20* (2006.01)

(52) U.S. Cl.
CPC .......... *G06K 9/0004* (2013.01); *G06F 3/041* (2013.01); *G06F 3/0416* (2013.01); *G06K 9/2027* (2013.01)

(58) Field of Classification Search
CPC ........ G06K 9/00006–0012; G06K 2009/0006; G09G 2320/048
See application file for complete search history.

(56) References Cited

U.S. PATENT DOCUMENTS

| | | | |
|---|---|---|---|
| 10,185,861 B2* | 1/2019 | Zeng | H01L 27/3265 |
| 10,387,712 B2* | 8/2019 | Zeng | G06K 9/001 |
| 10,679,031 B2* | 6/2020 | Peng | G06K 9/0004 |
| 2004/0228508 A1* | 11/2004 | Shigeta | G06K 9/00026 382/124 |
| 2007/0035489 A1* | 2/2007 | Lee | G09G 3/3233 345/77 |
| 2009/0166411 A1 | 7/2009 | Kramer et al. | |

(Continued)

FOREIGN PATENT DOCUMENTS

| | | |
|---|---|---|
| CN | 101169824 | 4/2008 |
| CN | 202632317 | 12/2012 |

(Continued)

OTHER PUBLICATIONS

EPO, Office Action for EP Application No. 18805729.3, dated Apr. 15, 2020.
WIPO, ISR for PCT/CN2018/084707, dated Aug. 1, 2018.

*Primary Examiner* — Patrick F Marinelli
(74) *Attorney, Agent, or Firm* — Hodgson Russ LLP (57) ABSTRACT

A method for fingerprint collection and related products are provided. The method includes the following. Light-emitting units of a touch display screen are controlled to emit monochromatic light. The monochromatic light is configured to illuminate a fingerprint of a user. Collect the fingerprint of the user illuminated by the monochromatic light.

15 Claims, 3 Drawing Sheets

(56) References Cited

U.S. PATENT DOCUMENTS

| | | | |
|---|---|---|---|
| 2016/0110025 A1 | 4/2016 | Hossu | |
| 2017/0300736 A1* | 10/2017 | Song | G06K 9/0004 |
| 2017/0352310 A1* | 12/2017 | Kim | G09G 3/32 |
| 2018/0068157 A1* | 3/2018 | Zeng | G06K 9/001 |
| 2018/0074627 A1* | 3/2018 | Kong | G06F 21/32 |
| 2018/0096660 A1* | 4/2018 | Liu | G09G 3/2003 |
| 2018/0129852 A1* | 5/2018 | Zeng | H01L 27/3276 |
| 2019/0005908 A1* | 1/2019 | Chen | G09G 3/3406 |
| 2019/0102594 A1* | 4/2019 | Peng | G06K 9/00087 |
| 2019/0102597 A1* | 4/2019 | Lu | G09G 5/10 |
| 2019/0114458 A1* | 4/2019 | Cho | G09G 3/20 |
| 2019/0130155 A1* | 5/2019 | Park | G09G 3/3208 |
| 2019/0205605 A1* | 7/2019 | Kim | G06K 9/0004 |
| 2020/0058249 A1* | 2/2020 | Ok | G09G 3/20 |
| 2020/0082143 A1* | 3/2020 | Yang | G06F 3/041 |
| 2020/0265779 A1* | 8/2020 | In | G09G 3/3225 |
| 2020/0279086 A1* | 9/2020 | Wang | G06K 9/001 |
| 2020/0279527 A1* | 9/2020 | Feng | G06F 3/0416 |
| 2020/0334438 A1* | 10/2020 | Cheng | G06K 9/0004 |

FOREIGN PATENT DOCUMENTS

| | | |
|---|---|---|
| CN | 104318205 | 1/2015 |
| CN | 104714333 | 6/2015 |
| CN | 105794304 | 7/2016 |
| CN | 205644579 | 10/2016 |
| CN | 106130734 | 11/2016 |
| CN | 106203408 | 12/2016 |
| CN | 106453812 | 2/2017 |
| CN | 107256068 | 10/2017 |
| DE | 102017125292 | 10/2018 |

\* cited by examiner

METHOD FOR FINGERPRINT COLLECTION AND RELATED PRODUCTS

CROSS-REFERENCE TO RELATED APPLICATIONS

This application is a continuation of International Application No. PCT/CN2018/084707, filed on Apr. 26, 2018, which claims priority to Chinese Patent Application No. 201710366587.1, filed on May 22, 2017, the entire disclosures of which are incorporated herein by reference.

TECHNICAL FIELD

This disclosure relates to the technical field of electronics and particularly to a method for fingerprint collection and related products.

BACKGROUND

Nowadays, the fingerprint function has become the standard for smart phones. It can be seen that mobile phones without fingerprint function cannot keep up with the times. Fingerprint sensors are key devices for automatic fingerprint collection. In terms of the sensing principle, the fingerprint sensors can include an optical fingerprint sensor, a semiconductor capacitor sensor, an ultrasonic sensor, and the like.

The optical fingerprint sensor utilizes the principle of refraction and reflection of light. Light emitted by a light source has different angles of refraction and reflected light of different brightness on uneven lines of a fingerprint of a finger. The complementary metal-oxide-semiconductor transistor (CMOS) or charge coupled device (CCD) optics collects image information in different brightness to complete the fingerprint collection.

The convenience of functions such as fingerprint unlocking and fingerprint payment leads to more frequent use of the fingerprint function. Assuming that light for fingerprint collection is from a screen of the mobile phone, with increase in the use of the fingerprint function, the service life of the screen of the mobile phone will decrease. Therefore, how to balance the service life of the screen of the mobile phone and the use of the fingerprint function is a technical problem to be solved.

SUMMARY

According to a first aspect, implementations provide a terminal device. The terminal device includes an application processor (AP), a touch display screen, and an optical fingerprint sensor disposed under the touch display screen.

The AP is configured to control light-emitting units of the touch display screen to emit monochromatic light, where the monochromatic light is configured to illuminate a fingerprint of a user. The optical fingerprint sensor is configured to collect the fingerprint of the user illuminated by the monochromatic light.

According to a second aspect, implementations provide a method for fingerprint collection. The method includes the following. Light-emitting units of a touch display screen of a terminal device are controlled, with an application processor (AP) of a terminal device, to emit monochromatic light. The monochromatic light is configured to illuminate a fingerprint of a user. Collect, with an optical fingerprint sensor of the terminal device, the fingerprint of the user illuminated by the monochromatic light, where the optical fingerprint sensor is disposed under the touch display screen.

According to a third aspect, implementations provide a non-transitory computer readable storage medium. The non-transitory computer readable storage medium is configured to store a computer program which, when executed by a terminal device, causes the terminal device to execute the method of the second aspect.

BRIEF DESCRIPTION OF THE DRAWINGS

To describe technical solutions in implementations or in the related art more clearly, the following briefly introduces the accompanying drawings required for describing the implementations or the related art.

DETAILED DESCRIPTION

In order for those skilled in the art to better understand technical solutions, in the following, technical solutions of implementations will be described clearly and completely with reference to accompanying drawings in implementations. Apparently, implementations described hereinafter are merely some implementations, rather than all implementations. All other implementations obtained by those of ordinary skill in the art based on implementations without creative efforts shall fall within the protection scope.

Hereinafter, implementations will be described in detail.

The terms "first", "second", "third", "fourth", and the like used in the specification, the claims, and the accompany drawings are used to distinguish different objects rather than describe a particular order. In addition, the terms "include", "comprise", and "have" as well as variations thereof are intended to cover non-exclusive inclusion. For example, a process, method, system, product, or apparatus including a series of steps or units is not limited to the listed steps or units. Instead, it can optionally include other steps or units that are not listed; alternatively, other steps or units inherent to the process, method, product, or apparatus can also be included.

The term "implementation" referred to herein means that a particular feature, structure, or character described in conjunction with the implementation may be contained in at least one implementation. The phrase appearing in various places in the specification does not necessarily refer to the same implementation, nor does it refer to an independent or alternative implementation that is mutually exclusive with other implementations. It is explicitly and implicitly understood by those skilled in the art that an implementation described herein may be combined with other implementations.

A terminal device, also called a user equipment (UE), is a device that provides voice and/or data connectivity to a user, for example, a handheld device, an in-vehicle device, or the like that has a wireless connection function. Terminals generally include, for example, mobile phones, tablets, notebook computers, PDAs, mobile Internet devices (MIDs), wearable devices such as smart watches, smart bracelets, pedometers, and the like.

The following describes implementations with reference to the accompanying drawings.

Figure 1:
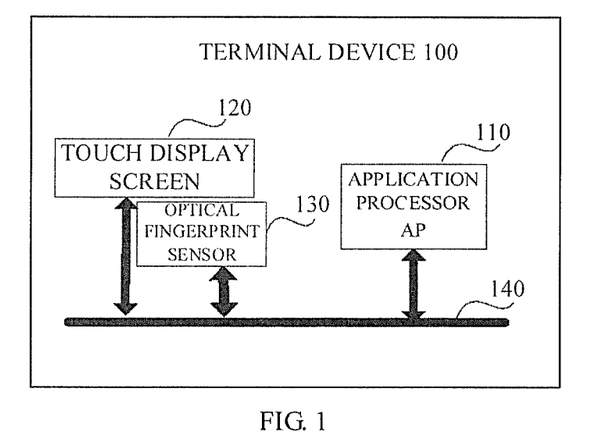
FIG. 1 is a schematic structural diagram illustrating a terminal device according to implementations.

FIG. 1 is a schematic structural diagram illustrating a terminal device 100 according to implementations. The terminal device 100 includes an application processor (AP) 110, a touch display screen 120, and an optical fingerprint sensor 130. The optical fingerprint sensor 130 is disposed under the touch display screen 120. The AP 110 is coupled with the touch display screen 120 and the optical fingerprint sensor 130 via a bus 140.

The AP 110 is configured to control light-emitting units of the touch display screen 120 to emit monochromatic light or single-colored light, where the monochromatic light is configured to illuminate a fingerprint of a user.

They optical fingerprint sensor 130 is configured to collect the fingerprint of the user illuminated by the monochromatic light, so as to obtain a fingerprint image. As used herein, fingerprint collection can be comprehended as fingerprint image collection.

In at least one implementation, the touch display screen 120 is one of: a liquid crystal display (LCD), an organic light-emitting diode (OLED) display, and a light-emitting diode (LED) display.

In at least one implementation, the monochromatic light is green light, red light, or blue light.

In an example, when a fingerprint collection instruction is detected, the AP 110 controls the light-emitting units of the touch display screen 120 to emit the monochromatic light. The fingerprint collection instruction is sent by the touch display screen 120 to the AP 110 when the touch display screen 120 detects a touch operation of the user on the touch display screen 120. In another example, the fingerprint collection instruction is sent by a fingerprint payment application to the AP 110 when the fingerprint payment application detects a fingerprint payment action. The disclosure is not limited herein.

In an example, the AP 110 is configured to control the light-emitting units of the touch display screen 120 to emit the monochromatic light. The monochromatic light is green light.

The service life of an RGB display generally depends on a light-emitting material with shortest service life of three (kinds of) light-emitting materials (including a blue light material, a red light material, and a green light material), typically, the blue light material that emits blue light. If the display keeps emitting blue light, the blue light material will fail, which means that the display will fail. That is, in terms of service life, the blue light material is the weakness among the three light-emitting materials. To prolong the service of the display, in fingerprint collection, it is better to use the green light material with longest service life. Moreover, since green is a color least contained in the color of the skin, in fingerprint collection, brightness of a fingerprint collected with green light is higher than that of a fingerprint collected with red light or blue light, thereby ensuring quality of the fingerprint collected.

Furthermore, the touch display can emit blue light through the blue light material or through the green light material. For example, the touch screen surface plasma-coupled technology converts a light-emitting spectrum of the green light material into a light-emitting spectrum corresponding to blue light, which in turn causes the touch display screen to emit blue light.

According to the technical solutions, in fingerprint collection, the light-emitting units of the touch display screen are controlled to emit monochromatic light only, to ensure longer service life of the screen of the mobile phone.

In at least one implementation, the touch display screen includes N areas for fingerprint collection, where N is a positive integer. In terms of controlling the light-emitting units of the touch display screen 120 to emit the monochromatic light, the AP is configured to control light-emitting units in one of the N areas to emit the monochromatic light.

Figure 2:
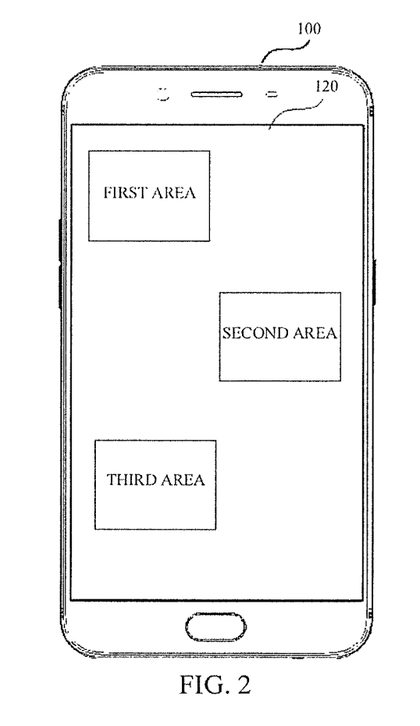
FIG. 2 is a schematic diagram illustrating N areas for fingerprint collection according to implementations.

The N areas each are a small area of the touch display screen. Assuming N=3, three areas are a first area, a second area, and a third area, which are illustrated in FIG. 2.

Furthermore, the area for fingerprint collection is in a shape of circular, square, elliptical, diamond, or the like, which is not limited herein.

Furthermore, the N areas are the same in shape. For example, N=3 and the three areas each are circular. Alternatively, the N areas are different in shape. For example, N=3, the first area has a shape of circular, the second area has a shape of square, and the third area has a shape of elliptical. Alternatively, some of the N areas are the same in shape. For example, N=3, the first area has a shape of circular, the second area has a shape of circular, and the third area has a shape of elliptical.

Furthermore, the N areas are the same in size. For example, N=3 and the three areas each have a size of A. Alternatively, the N areas are different in size. For example, N=3, the first area has a size of A, the second area has a size of B, and the third area has a size of C. Alternatively, some of the N areas are the same in size. For example, N=3, the first area has a size of A, the second area has a size of B, and the third area has a size of A.

Furthermore, if at least two areas of the N areas are intersect with each other, a light-emitting material of a certain color at intersection of the at least two areas may fail due to frequent use of such light-emitting material. Therefore, in the solution, the N areas do not intersect with each other.

In at least one implementation, the N areas correspond to N sets of time periods. The N areas are in one-to-one correspondence with the N sets of time periods. Each set of time periods contains at least one time period. In terms of controlling the light-emitting units in one of the N areas to emit the monochromatic light, the AP 110 is configured to control light-emitting units in an area i corresponding to a current system time to emit the monochromatic light, where the area i is one of the N areas.

For example, supposing N=3, the three areas are a first area, a second area, and a third area and three sets of time periods are a first set of time periods, a second set of time periods, and a third set of time periods. The first area corresponds to the first set of time periods. The second area corresponds to the second set of time periods. The third area corresponds to the third set of time periods. If the current system time falls within the first set of time periods, the terminal device controls the first area to emit the monochromatic light.

Furthermore, the at least one time period contained in each of the N sets of time periods is the same in number. For example, N=3 and the three sets of time periods each contain three time periods. Alternatively, the at least one time period contained in each of the N sets of time periods is different in number. For example, N=3, the first set of time periods contains two time periods, the second set of time periods contains three time periods, and the third set of time periods contains five time periods. Alternatively, at least one time period contained in at least two of the N sets of time periods is the same in number. For example, N=3, the first set of time periods contains three time periods, the second set of time periods contains three time periods, and the third set of time periods contains five time periods.

Furthermore, the N sets of time periods does not overlap with each other.

Furthermore, each of the N sets of time periods has a same total duration which is a sum of all time periods contained in a set of time periods. For example, N=3 and the three sets of time periods each have a total duration of eight hours. Alternatively, each of the N sets of time periods is different in total duration. For example, N=3, the first set of time periods has a total duration of seven hours, the second set of time periods has a total duration of eight hours, and the third set of time periods has a total duration of nine hours. Alternatively, at least two of the N sets of time periods are the same in total duration. For example, N=3, the first set of time periods has a total duration of seven hours, the second set of time periods has a total duration of seven hours, and the third set of time periods has a total duration of ten hours.

Furthermore, time periods contained in each of the N sets of time periods are the same in length. For example, a set of time periods i contains three time periods and the three time periods each have a length of two hours. Alternatively, the time periods contained in each of the N sets of time periods are different in length. For example, the set of time periods i contains three time periods, where a first time period has a length of two hours, a second time period has a length of four hours, and a third time period has a length of five hours. Alternatively, at least two of the time periods contained in each of the N sets of time periods are the same in length. For example, the set of time periods i contains three time periods, where the first time period has a length of three hours, the second time period has a length of three hours, and the third time period has a length of two hours.

In at least one implementation, each time period contained in each set of time periods corresponds to one kind of monochromatic light. In terms of controlling the light-emitting units in the area i corresponding to the current system time to emit the monochromatic light, the AP 110 is configured to control the light-emitting units in the area i to emit monochromatic light corresponding to the current system time.

For example, if a set of time periods corresponding to the area i contains three time periods, the three time periods are a first time period, a second time period, and a third time period. The first time period corresponds color 1. The second time period corresponds color 2. The third time period corresponds color 3. If the current system time falls within the first time period, the terminal device controls the area i to emit light of color 1.

Furthermore, each time period contained in each of the N sets of time periods corresponds a same color of light. For example, the set of time periods i contains three time periods and the three time periods each correspond green light. Alternatively, when each set of time periods contains three or less time periods, each time period contained in each of the N sets or time periods corresponds a different color of light. For example, the set of time periods i contains three time periods, the first time period corresponds to green light, the second time period corresponds to red light, and the third time period corresponds to blue light. Alternatively, at least two of time periods contained in each of the N sets of time periods correspond different colors of light. For example, the set of time periods i contains three time periods, the first time period corresponds to green light, the second time period corresponds to green light, and the third time period corresponds to red light. It is to be noted, the set of time periods i is any of the N sets of time periods.

Furthermore, each time period contained in each of the N sets of time periods does not overlap with each other. For example, the set of time periods i contains three time periods and the three time periods has no intersection.

Furthermore, the monochromatic light includes green light, red light, or blue light. If the number of time periods contained in a set of time periods corresponding to an area I is M, the equation: $3X-2Y+1Z=M$ is met. In the above equation, X is the number of time periods corresponding to green light, Y is the number of time periods corresponding to red light, and Z is the number of time periods corresponding to blue light. X is greater than Y and Y is greater than Z. When M is equal to or less than 3, Y and Z are equal to 0. When M is equal to or less than 5, Z is equal to 0. The area I is any of the N areas.

Lighting-materials of RGB display include a blue light material, a red light material, and a green light material, among which, the green light material has the longest service life, followed by the red light material, and the blue light material has the shortest service life. In order to prolong the service life of the screen of the mobile phone while using the fingerprint function, it is necessary to reasonably use the three lighting-materials. For one example, if M=2, then X=2, Y=0, and Z=0. For another example, if M=5, then X=3, Y=2, and Z=0. For another example, if M=7, then X=4, Y=2, and Z=1.

Furthermore, if X is greater than 1, X time periods may or may not be adjacent, which is not limited herein. If Y is greater than 1, Y time periods may or may not be adjacent, which is not limited herein. If Z is greater than 1, Z time periods may or may not be adjacent, which is not limited herein.

In at least one implementation, each kind of monochromatic light corresponds to at least one light-emitting material. The AP is further configured to: determine, for the touch display screen or one of the N areas, service life of at least one light-emitting material corresponding to red light, blue light, and green light respectively. In terms of controlling the light-emitting units of the touch display screen to emit the monochromatic light, the AP is configured to control the light-emitting units of the touch display screen or the light-emitting units in one of the N areas to emit light of target color, where at least one light-emitting material corresponding to the light of target color has the longest service life.

Figure 3:
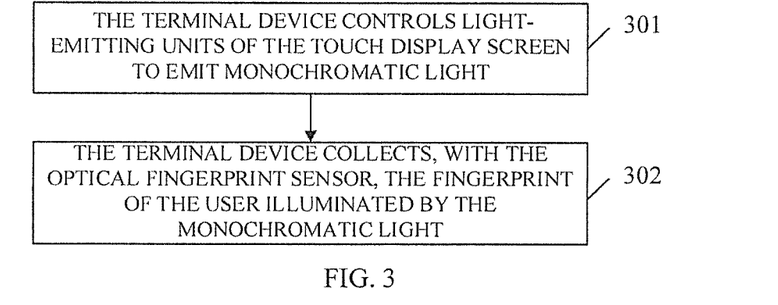
FIG. 3 is a schematic flow chart illustrating a method for fingerprint collection according to implementations.

FIG. 3 is a schematic flow chart illustrating a method for fingerprint collection according to implementations. The method for fingerprint collection is applicable to a terminal device. The terminal device includes an application processor (AP), a touch display screen, and an optical fingerprint sensor. The optical fingerprint sensor is disposed under the touch display screen. The method begins at block 301.

At block 301, the terminal device controls light-emitting units of the touch display screen to emit monochromatic light, where the monochromatic light is configured to illuminate a fingerprint of a user.

In at least one implementation, the monochromatic light is green light, red light, or blue light.

In an example, the terminal device controls the light-emitting units of the touch display screen to emit the monochromatic light. The monochromatic light is green light.

The service life of an RGB display generally depends on a light-emitting material with shortest service life of three light-emitting materials (including a blue light material, a red light material, and a green light material), typically, the blue light material that emits blue light. If the display keeps emitting blue light, the blue light material will fail, which means that the display will fail. That is, in terms of service life, the blue light material is the weakness among the three light-emitting materials. To prolong the service of the display, it is better to use the green light material with longest service life for fingerprint collection. Moreover, since green is a color least contained in the color of the skin, in fingerprint collection, brightness of a fingerprint collected with green light is higher than that of a fingerprint collected with red light or blue light, thereby ensuring quality of the fingerprint collected.

Furthermore, the touch display can emit blue light through the blue light material or through the green light material. For example, the touch screen surface plasma-coupled technology converts a light-emitting spectrum of the green light material into a light-emitting spectrum corresponding to blue light, which in turn causes the touch display screen to emit blue light.

According to the technical solutions, in fingerprint collection, the light-emitting units of the touch display screen are controlled to emit monochromatic light only, to ensure longer service life of the screen of the mobile phone.

In at least one implementation, the touch display screen includes N areas for fingerprint collection, where N is a positive integer. The terminal device controls the light-emitting units of the touch display screen to emit the monochromatic light as follows. The terminal device controls light-emitting units in one of the N areas to emit the monochromatic light. The N areas each are a small area of the touch display screen.

Furthermore, the area for fingerprint collection is in a shape of circular, square, elliptical, diamond, or the like, which is not limited herein.

Furthermore, the N areas are the same in shape. For example, N=3 and three areas (including a first area, a second area, and a third area) each are circular. Alternatively, the N areas are different in shape. For example, N=3, the first area has a shape of circular, the second area has a shape of square, and the third area has a shape of elliptical. Alternatively, some of the N areas are the same in shape. For example, N=3, the first area has a shape of circular, the second area has a shape of circular, and the third area has a shape of elliptical.

Furthermore, the N areas are the same in size. For example, N=3 and the three areas each have a size of A. Alternatively, the N areas are different in size. For example, N=3, the first area has a size of A, the second area has a size of B, and the third area has a size of C. Alternatively, some of the N areas are the same in size. For example, N=3, the first area has a size of A, the second area has a size of B, and the third area has a size of A.

Furthermore, if at least two areas of the N areas are overlap with each other, a light-emitting material of a certain color at overlap of the at least two areas may fail due to frequent use of such light-emitting material. Therefore, in the solution, the N areas do not overlap with each other.

In at least one implementation, the N areas correspond to N sets of time periods. The N areas are in one-to-one correspondence with the N sets of time periods. Each set of time periods contains at least one time period. The terminal device controls the light-emitting units in one of the N areas to emit the monochromatic light as follows. The terminal device controls light-emitting units in an area i corresponding to a current system time to emit the monochromatic light, where the area i is one of the N areas.

For example, supposing N=3, the three areas are a first area, a second area, and a third area and three sets of time periods are a first set of time periods, a second set of time periods, and a third set of time periods. The first area corresponds to the first set of time periods. The second area corresponds to the second set of time periods. The third area corresponds to the third set of time periods. If the current system time falls within the first set of time periods, the terminal device controls the first area to emit the monochromatic light.

Furthermore, the at least one time period contained in each of the N sets of time periods is the same in number. For example, N=3 and the three sets of time periods each contain three time periods. Alternatively, the at least one time period contained in each of the N sets of time periods is different in number. For example, N=3, the first set of time periods contains two time periods, the second set of time periods contains three time periods, and the third set of time periods contains five time periods. Alternatively, at least one time period contained in at least two of the N sets of time periods is the same in number. For example, N=3, the first set of time periods contains three time periods, the second set of time periods contains three time periods, and the third set of time periods contains five time periods.

Furthermore, the N sets of time periods does not overlap with each other.

Furthermore, each of the N sets of time periods is the same in total duration. For example, N=3 and the three sets of time periods each have a total duration of eight hours. Alternatively, each of the N sets of time periods is different in total duration. For example, N=3, the first set of time periods has a total duration of seven hours, the second set of time periods has a total duration of eight hours, and the third set of time periods has a total duration of nine hours. Alternatively, at least two of the N sets of time periods are the same in total duration. For example, N=3, the first set of time periods has a total duration of seven hours, the second set of time periods has a total duration of seven hours, and the third set of time periods has a total duration of ten hours.

Furthermore, time periods contained in each of the N sets of time periods are the same in length. For example, a set of time periods i contains three time periods and the three time periods each have a length of two hours. Alternatively, the time periods contained in each of the IV sets of time periods are different in length. For example, the set of time periods i contains three time periods, where a first time period has a length of two hours, a second time period has a length of four hours, and a third time period has a length of five hours. Alternatively, at least two of the time periods contained in each of the N sets of time periods are the same in length. For example, the set of time periods i contains three time periods, where the first time period has a length of three hours, the second time period has a length of three hours, and the third time period has a length of two hours.

In at least one implementation, each time period contained in each set of time periods corresponds to one kind of monochromatic light. The terminal device controls the light-emitting units in the area i corresponding to the current system time to emit the monochromatic light as follows. The terminal device controls the light-emitting units in the area i to emit monochromatic light corresponding to the current system time.

For example, if a set of time periods corresponding to the area i contains three time periods, the three time periods are a first time period, a second time period, and a third time period. The first time period corresponds color 1. The second time period corresponds color 2. The third time period corresponds color 3. If the current system time falls within the first time period, the terminal device controls the area i to emit light of color 1.

Furthermore, each time period contained in each of the N sets of time periods corresponds a same color of light. For example, the set of time periods i contains three time periods and the three time periods each correspond green light. Alternatively, when each set of time periods contains three or less time periods, each time period contained in each of the N sets of time periods corresponds a different color of light. For example, the set of time periods i contains three time periods, where the first time period corresponds to green light, the second time period corresponds to red light, and the third time period corresponds to blue light. Alternatively, at least two of time periods contained in each of the N sets of time periods correspond different colors of light. For example, the set of time periods i contains three time periods, where the first time period corresponds to green light, the second time period corresponds to green light, and the third time period corresponds to red light. It is to be noted, the set of time periods i is any of the N sets of time periods.

Furthermore, each time period contained in each of the N sets of time periods does not overlap with each other. For example, the set of time periods i contains three time periods and the three time periods has no intersection.

Furthermore, the monochromatic light includes green light, red light, or blue light. If the number of time periods contained in a set of time periods corresponding to an area I is M, the equation: $3X+2Y+1Z=M$ is met. In the above equation, X is the number of time periods corresponding to green light, Y is the number of time periods corresponding to red light, and Z is the number of time periods corresponding to blue light. X is greater than Y and Y is greater than Z. When M is equal to or less than 3, Y and Z are equal to 0. When M is equal to or less than 5, Z is equal to 0. The area I is any of the N areas.

Lighting-materials of RGB display include a blue light material, a red light material, and a green light material, among which, the green light material has the longest service life, followed by the red light material, and the blue light material has the shortest service life. In order to prolong the service life of the screen of the mobile phone while using the fingerprint function, it is necessary to reasonably use the three lighting-materials. For one example, if M=2, then X=2, Y=0, and Z=0. For another example, if M=5, then X=3, Y=2, and Z=0. For another example, if M=7, then X=4, Y=2, and Z=1.

Furthermore, if X is greater than 1, X time periods may or may not be adjacent, which is not limited herein. If Y is greater than 1, Y time periods may or may not be adjacent, which is not limited herein. If Z is greater than 1, Z time periods may or may not be adjacent, which is not limited herein.

In at least one implementation, the monochromatic light is green light, red light, or blue light, and each kind of monochromatic light corresponds to at least one light-emitting material. The following is further conducted. Determine, for the touch display screen or one of the N areas, service life of at least one light-emitting material corresponding to red light, blue light, and green light respectively. The terminal device controls the light-emitting units of the touch display screen to emit the monochromatic light as follows. The terminal device controls the light-emitting units of the touch display screen or the light-emitting units in one of the N areas to emit light of target color, where at least one light-emitting material corresponding to the light of target color has the longest service life.

At block 302, the terminal device collects, with the optical fingerprint sensor, the fingerprint of the user illuminated by the monochromatic light.

Figure 4:
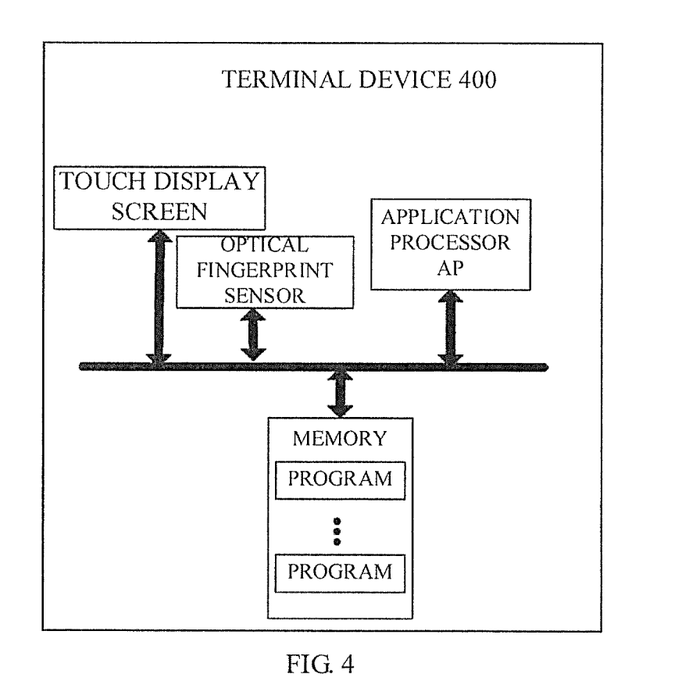
FIG. 4 is a schematic structural diagram illustrating a terminal device according to other implementations.

FIG. 4 is a schematic structural diagram illustrating a terminal device according to other implementations. The terminal device includes at least one processor, a touch display screen, an optical fingerprint sensor, and a memory. The at least one processor includes an application processor (AP). The optical fingerprint sensor is disposed under the touch display screen. The memory is configured to store one or more programs. The one or more programs are configured to be executed by the AP and include instructions configured to: control light-emitting units of the touch display screen to emit monochromatic light, where the monochromatic light is configured to illuminate a fingerprint of a user, and collect the fingerprint of the user illuminated by the monochromatic light.

According to the technical solutions, in fingerprint collection, the light-emitting units of the touch display screen are controlled to emit monochromatic light only, to ensure longer service life of the screen of the mobile phone.

In an example, the touch display screen includes N areas for fingerprint collection, where N is a positive integer. The instructions of the one or more programs are configured to control light-emitting units in one of the N areas to emit the monochromatic light.

In an example, the N areas correspond to N sets of time periods and each set of time periods contains at least one time period. The instructions of the one or more programs are configured to control light-emitting units in an area i corresponding to a current system time to emit the monochromatic light, where the area i is one of the N areas.

In an example, each time period contained in each set of time periods corresponds to one kind of monochromatic light. The instructions of the one or more programs are configured to control the light-emitting units in the area i to emit monochromatic light corresponding to the current system time.

In an example, the monochromatic light is green light, red light, or blue light, and each kind of monochromatic light corresponds to at least one light-emitting material. The one or more programs further include instructions configured to: determine, for the touch display screen or one of the N areas, service life of at least one light-emitting material corresponding to red light, blue light, and green light respectively. The instructions of the one or more programs are configured to control the light-emitting units of the touch display screen or the light-emitting units in one of the N areas to emit light of target color, where at least one light-emitting material corresponding to the light of target color has the longest service life.

Figure 5:
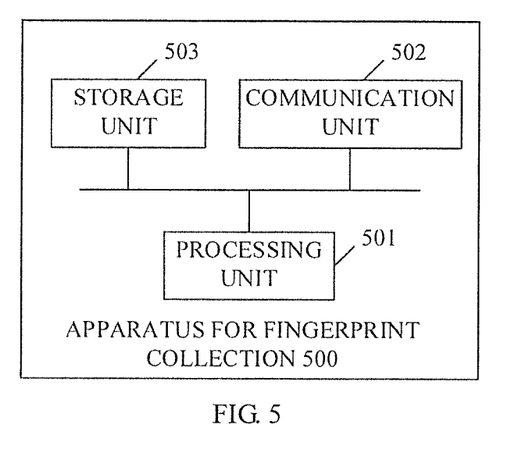
FIG. 5 is a schematic structural diagram illustrating an apparatus for fingerprint collection according to implementations.

FIG. 5 is a schematic structural diagram illustrating, an apparatus 500 for fingerprint collection according to implementations. The apparatus 500 for fingerprint collection is applicable to a terminal device. The terminal device includes an application processor (AP), a touch display screen, and an optical fingerprint sensor. The optical fingerprint sensor is disposed under the touch display screen. The apparatus for Fingerprint collection includes a processing unit 501, a communication unit 502, and a storage unit 503.

The processing unit 501 is configured to control light-emitting units of the touch display screen to emit monochromatic light, where the monochromatic light is configured to illuminate a fingerprint of a user, and configured to collect the fingerprint of the user illuminated by the monochromatic light.

The processing unit 501 may be, a processor or a controller (for example, a central processing unit (CPU)), a general-purpose processor, a digital signal processor (DSP), an application-specific integrated circuit (ASIC), a field programmable gate array (FPGA), or other programmable logic devices, transistor logic devices, hardware components, or any combination thereof. Various exemplary logical blocks, modules, and circuits described in conjunction with the disclosure may be achieved or implemented. The processor may also be a combination of computing functions, for example, a combination of one or more microprocessors, a combination of the DSP and the microprocessor, and the like. The communication unit 502 may be a transceiver, a transceiver circuit, a radio frequency chip, a communication interface, or the like. The storage unit 503 may be a memory.

When the processing unit 501 is the processor, the communication unit 502 is the communication interface, and the storage unit 503 is the memory, the apparatus for fingerprint collection provided herein can be a terminal device illustrated in FIG. 4.

Figure 6:
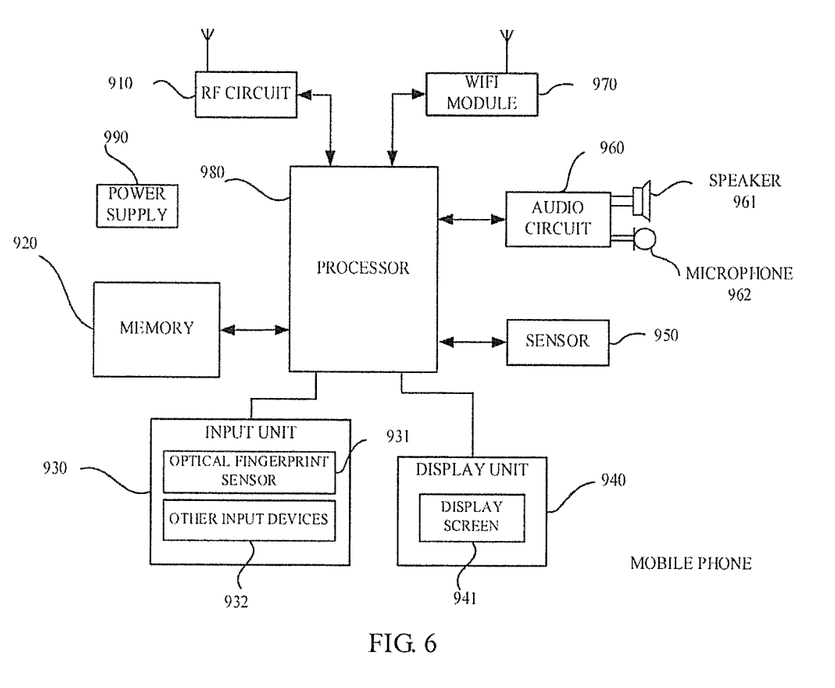
FIG. 6 is a schematic structural diagram illustrating a terminal device according to other implementations.

Implementations also provide another terminal device. As illustrated in FIG. 6, only parts related to the implementations are illustrated for ease of description. For technical details not described, reference may be made to the method implementations. The terminal device may be any device, such as a mobile phone, a tablet computer, a personal digital assistant (PDA), a point of sale terminal (POS), an on-board computer and the like. The following describes the mobile phone as an example of the terminal device.

FIG. 6 is a structural diagram illustrating parts of a mobile phone related to the terminal device according to other implementations. As illustrated in FIG. 6, the mobile phone includes a radio frequency (RF) circuit 910, a memory 920, an input unit 930, a display unit 940, a sensor 950, an audio circuit 960, a wireless fidelity (Wi-Fi) module 970, a processor 980, a power supply 990 and other components. Those skilled in the art can understand that the structure of the mobile phone illustrated in FIG. 6 does not constitute any limitation on a mobile phone. The mobile phone configured to implement technical solutions may include more or fewer components than illustrated or may combine certain components or different components.

In the following, various components of the mobile phone will be described in detail with reference to FIG. 6.

The RF circuit 910 is configured to transmit or receive information. Generally, the RF circuit 910 includes but is not limited to an antenna, at least one amplifier, a transceiver, a coupler, a low noise amplifier (LNA), a duplexer, and the like. In addition, the RF circuit 910 may also communicate with the network and other devices via wireless communication. The above wireless communication may use any communication standard or protocol, which includes but is not limited to global system of mobile communication (GSM), general packet radio service (GPRS), code division multiple access (CDMA), wideband code division multiple access (WCDMA), long term evolution (LTE), E-mail, short messaging service (SMS), and so on.

The memory 920 is configured to store software programs and modules, and the processor 980 is configured to execute various function applications and data processing of the mobile phone by running the software programs and the modules stored in the memory 920. The memory 920 mainly includes a program storage area and a data storage area. The program storage area may store an operating system, application programs required for at least one function, and so on. The data storage area may store data (such as N sets of time periods corresponding to N areas, and at least one time period contained in each set of time periods) created according to use of they mobile phone, and so on. In addition, the memory 920 may include a high-speed RAM, and may further include a non-volatile memory such as at least one disk storage device, a flash memory device, or other non-volatile solid-state storage devices.

The input unit 930 may be configured to receive input digital or character information and generate key signal input associated with user setting and function control of the mobile phone. The input unit 930 may include an optical fingerprint sensor 931 and other input devices 932. The optical fingerprint sensor 931 can collect the fingerprint of the user. In addition to the optical fingerprint sensor 931, the input unit 930 may further include other input devices 932. The other input devices 932 may include, but are not limit to, one or more of a touch screen, a physical key, a function key (such as a volume control key, a switch key, etc.), a trackball, a mouse, a joystick, and the like.

The display unit 940 is configured to display information input by the user or information provided for the user or various menus of the mobile phone. The display unit 940 may include a display screen 941. The display screen 941 may be in the form of a liquid crystal display (LCD), an organic light-emitting diode (OLED), and so on. Although the optical fingerprint sensor 931 and the display screen 941 are illustrated as two separate components in FIG. 6 to realize the input and output functions of the mobile phone, in other examples, the optical fingerprint sensor 931 may be integrated with the display screen 941 to implement the input and output functions of the mobile phone.

The mobile phone may also include at least one sensor 950, such as a light sensor, a motion sensor, and other sensors. The light sensor may include an ambient light sensor and a proximity sensor, among which the ambient light sensor may adjust the brightness of the display screen 941 according to ambient lights, and the proximity sensor may turn off the display screen 941 and/or backlight when the mobile phone reaches nearby the ear. As a kind of motion sensor, an accelerometer sensor can detect the magnitude of acceleration in all directions (typically three axes) and when the mobile phone is stationary, the accelerometer sensor can detect the magnitude and direction of gravity; the accelerometer sensor can also identify gestures of the mobile phone (such as vertical and horizontal screen switch, related games, magnetometer attitude calibration), or the accelerometer sensor can be used for vibration-recognition related functions (such as a pedometer, percussion) and so on. The mobile phone can also be equipped with a gyroscope, a barometer, a hygrometer, a thermometer, and an infrared sensor and other sensors, and it will not be repeated herein.

The audio circuit 960, a speaker 961, a microphone 962 may provide an audio interface between the user and the mobile phone. The audio circuit 960 may convert the received audio data into electrical signals and transfer the electrical signals to the speaker 961; thereafter the speaker 961 converts the electrical signals into sound signals for output. On the other hand, the microphone 962 converts the received sound signals into electrical signals, which will be received and converted into audio data by the audio circuit 960 for output. The audio data is then processed and transmitted by the processor 980 via the RF circuit 910 to another mobile phone for example, or the audio data is output to the memory 920 for further processing.

Wi-Fi belongs to a short-range wireless transmission technology. With aid of the Wi-Fi module 970, the mobile phone may assist the user in E-mail receiving and sending, webpage browsing, access to streaming media, and the like. Wi-Fi provides users with wireless broadband Internet access. Although the Wi-Fi module 970 is illustrated in FIG. 6, it can be understood that, the Wi-Fi module 970 is not essential to the mobile phone and can be omitted according to actual needs without departing from the essential nature.

The processor 980 is the control center of the mobile phone and is configured to connect various parts of the whole mobile phone through various interfaces and lines, run or execute software programs and/or modules stored in the memory 920, and invoke data stored in the memory 920 to perform various functions of the mobile phone and process data, thereby monitoring the mobile phone as a whole. The processor 980 may include one or more processing units. For example, the processor 980 may integrate an application processor and a modem processor, where the application processor is configured to handle the operating system, the user interface, the application, and so on, and the modem processor is mainly configured to process wireless communication. It will be understood that the above-mentioned modem processor may not be integrated into the processor 980.

The mobile phone also includes a power supply 990 (e.g., a battery) that supplies power to various components. For instance, the power supply 990 may be logically connected to the processor 980 via a power management system to enable management of charging, discharging, and power consumption through the power management system.

Although not illustrated, the mobile phone may include a camera, a Bluetooth module, etc., and the disclosure will not elaborate herein.

The method of the foregoing implementations illustrated in FIG. 3 can be realized based on the structure of the mobile phone.

The functions of the units illustrated in FIG. 5 can be achieved based on the structure of the mobile phone.

Implementations further provides a computer storage medium. The computer storage medium may store computer programs for electronic data interchange, and the computer programs are operable with a computer to execute all or part of operations of any of the methods for fingerprint collection recited in the method implementations mentioned above.

Implementations further provide a computer program product. The computer program product includes a non-transitory computer readable storage medium that stores computer programs. The computer programs are operable with a computer to perform all or part of operations of any of the methods for fingerprint collection recited in the method implementations mentioned above. The computer program product may be a software installation package.

It is to be noted that, for the sake of simplicity, the foregoing method implementations are described as a series of action combinations, however, it will be appreciated by those skilled in the art that the present disclosure is not limited by the sequence of actions described. According to the present disclosure, certain steps or operations may be performed in other order or simultaneously. Besides, it will be appreciated by those skilled in the art that the implementations described in the specification are exemplary implementations and the actions and modules involved are not necessarily essential to the present disclosure.

In the foregoing implementations, the description of each implementation has its own emphasis. For the parts not described in detail in one implementation, reference may be made to related descriptions in other implementations.

In the implementations, it is to be understood that, the apparatus disclosed in implementations provided herein may be implemented in other manners. For example, the device/apparatus implementations described above are merely illustrative; for instance, the division of the unit is only a logical function division and there can be other manners of division during actual implementations, for example, multiple units or components may be combined or may be integrated into another system, or some features may be ignored or skipped. In addition, coupling or communication connection between each illustrated or discussed component may be direct coupling or communication connection, or may be indirect coupling or communication among devices or units via some interfaces, and may be electrical connection or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions essentially, or the part of the technical solutions that contributes to the related art, or all or part of the technical solutions, may be embodied in the form of a software product which is stored in a memory and includes instructions for causing a computer device (which may be a personal computer, a server, or a network device, and so on) to perform all or part of the steps described in the various implementations. The memory includes various medium capable of storing program codes, such as a universal serial bus (USB) flash disk, a read-only memory (ROM), a random-access memory (RAM), a removable hard disk, Disk, compact disc (CD), or the like.

It will be understood by those of ordinary skill in the art that all or part of the operations of the various methods of the implementations described above may be accomplished by means of a program to instruct associated hardware, the program may be stored in a computer-readable memory, which may include a flash memory, a ROM, a RAM, Disk or CD, and so on.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A terminal device comprising an application processor (AP), a touch display screen, and an optical fingerprint sensor disposed under the touch display screen, wherein:

the touch display screen comprises N areas for fingerprint collection, wherein N is a positive integer;

the AP is configured to:
control light-emitting units of the touch display screen to emit monochromatic light, wherein the monochromatic light is configured to illuminate a fingerprint of a user and each kind of monochromatic light corresponds to at least one light-emitting material;
control light-emitting units in one of the N areas to emit the monochromatic light;
determine, for the touch display screen or one of the N areas, service life of at least one light-emitting material corresponding to red light, blue light, and green light respectively; and
control the light-emitting units of the touch display screen or the light-emitting units in one of the N areas to emit light of a target color as the monochromatic light, wherein the light of target color has a longest service life; and
the optical fingerprint sensor is configured to collect the fingerprint of the user illuminated by the monochromatic light.

2. The terminal device of claim 1, wherein the touch display screen is one of:
a liquid crystal display (LCD), an organic light-emitting diode (OLED) display, and a light-emitting diode (LED) display.

3. The terminal device of claim 1, wherein the monochromatic light is green light, red light, or blue light.

4. The terminal device of claim 1, wherein the N areas do not overlap with each other.

5. The terminal device of claim 1, wherein the N areas correspond to N sets of time periods; and the AP is configured to control light-emitting units in an area i corresponding to a current system time to emit the monochromatic light, wherein the area i is one of the N areas.

6. The terminal device of claim 5, wherein each set of time periods contains at least one time period and each time period corresponds to one kind of monochromatic light; and the AP is configured to control light-emitting units in the area i to emit monochromatic light corresponding to the current system time.

7. A method for fingerprint collection of a terminal device, comprising:
controlling, with an application processor (AP) of the terminal device: light-emitting units of a touch display screen of the terminal device, that comprises of N areas for fingerprint collections, to emit monochromatic light, wherein the monochromatic light is configured to illuminate a fingerprint of a user, wherein N is a positive integer, and wherein each kind of monochromatic light corresponds to at least one light-emitting material;
controlling, with the AP of the terminal device, light-emitting units in one of the N areas to emit the monochromatic light;
determining for the touch display screen or one of the N areas, with the AP of the terminal device, service life of at least one light-emitting material corresponding to red light, blue light, and green light respectively;
controlling, with the AP of the terminal device, the light-emitting units of the touch display screen or the light-emitting units in one of the N areas to emit light of a target color as the monochromatic light, wherein the light of the target color has a longest service life; and
collecting, with an optical fingerprint sensor of the terminal device, the fingerprint of the user illuminated by the monochromatic light, wherein the optical fingerprint sensor is disposed under the touch display screen.

8. The method of claim 7, wherein the touch display screen is one of: a liquid crystal display (LCD), an organic light-emitting diode (OLED) display, and a light-emitting diode (LED) display.

9. The method of claim 7, wherein the monochromatic light is green light, red light, or blue light.

10. The method of claim 7, wherein the N areas do not overlap with each other.

11. The method of claim 7, wherein the N areas correspond to N sets of time periods; and controlling the light-emitting units in one of the N areas to emit the monochromatic light comprises: controlling light-emitting units in an area i corresponding to a current system time to emit the monochromatic light, wherein the area i is one of the N areas.

12. The method of claim 11, wherein each set of time periods contains at least one time period and each time period corresponds to one kind of monochromatic light;
and controlling the light-emitting units in the area i corresponding to the current system time to emit the monochromatic light comprises: controlling the light-emitting units in the area i to emit monochromatic light corresponding to the current system time.

13. A non-transitory computer readable storage medium storing a computer program which, when executed by a terminal device, causes the terminal device to carry out actions, comprising:
controlling, with an application processor (AP) of the terminal device: light-emitting units of a touch display screen of the terminal device, that comprises of N areas for fingerprint collections, to emit monochromatic light, wherein the monochromatic light is configured to illuminate a fingerprint of a user, wherein N is a positive integer, and wherein each kind of monochromatic light corresponds to at least one light-emitting material;
controlling, with the AP of the terminal device, light-emitting units in one of the N areas to emit the monochromatic light;
determining for the touch display screen or one of the N areas, with the AP of the terminal device, service life of at least one light-emitting material corresponding to red light, blue light, and green light respectively;
controlling, with the AP of the terminal device, the light-emitting units of the touch display screen or the light-emitting units in one of the N areas to emit light of a target color as the monochromatic light, wherein the light of the target color has a longest service life; and
collecting, with an optical fingerprint sensor of the terminal device, the fingerprint of the user illuminated by the monochromatic light, wherein the optical fingerprint sensor is disposed under the touch display screen.

14. The non-transitory computer readable storage medium of claim 13, wherein the N areas do not overlap with each other.

15. The non-transitory computer readable storage medium of claim 14, wherein the N areas correspond to N sets of time periods; and the computer program executed by the terminal device to carry out the action of controlling the light-emitting units in one of the N areas to emit the monochromatic light is executed by the terminal device to carry out actions, comprising: controlling light-emitting units in an area i corresponding to a current system time to emit the monochromatic light, wherein the area i is one of the N areas.

* * * * *